United States Patent [19]
Gordon et al.

[11] Patent Number: 6,128,553
[45] Date of Patent: Oct. 3, 2000

[54] MENU CONTROL KNOB

[75] Inventors: Thomas M. Gordon, Ely; Stephen R. Johnson, Cedar Rapids; C. Scott Cole, Marion, all of Iowa

[73] Assignee: Rockwell Collins, Inc., Cedar Rapids, Iowa

[21] Appl. No.: 09/122,452

[22] Filed: Jul. 24, 1998

[51] Int. Cl.[7] .............................. G06F 17/00; G06F 7/00
[52] U.S. Cl. .............................. 701/3; 701/28; 340/980; 345/184; 345/902
[58] Field of Search ............................ 701/1, 3, 13, 14, 701/28, 36; 345/184, 902; 340/438, 439, 980

[56] References Cited

U.S. PATENT DOCUMENTS

| | | |
|---|---|---|
| 4,634,970 | 1/1987 | Payne et al. ..................... 324/121 R |
| 4,644,337 | 2/1987 | Shank et al. ....................... 345/184 |
| 4,647,915 | 3/1987 | Shank et al. ....................... 345/157 |
| 5,627,531 | 5/1997 | Posso et al. ......................... 341/22 |

*Primary Examiner*—William A. Cuchlinski, Jr.
*Assistant Examiner*—Gertrude Arthur
*Attorney, Agent, or Firm*—Nathan O. Jensen; Kyle Eppele; J. P. O'Shaughnessy

[57] ABSTRACT

A remote menuing system uses a control knob to select menu items on a display screen. The menu items may be selected by depressing a switch, the switch being integrated with the control knob. Once the menu item has been selected, an operator may modify the value of the selected item by rotating the control knob. When a desired value is displayed, the item may be set by again depressing the switch integrated with the control knob. The use of an integrated control knob and switch, provides ease of use of a menu system while allowing the integrated knob to be located away from the display screen.

22 Claims, 4 Drawing Sheets

MENU CONTROL KNOB

FIELD OF THE INVENTION

The present invention is related to a user interface. More particularly, the present invention is related to an apparatus and method for selecting items from a display and modifying the value of selected items.

BACKGROUND OF THE INVENTION

Complex aircraft of today require electronic instruments that are relatively simple for a pilot to use while being relatively precise. Given the complexity of aircraft systems and the relatively cramped confines of the flight deck, it is desirable to have a large amount of information displayed to a pilot in a relatively compact format.

One such display unit for providing information to a pilot is a Primary Flight Display (PFD). The PFD displays flight critical information to the pilot on a relatively compact display screen. The information displayed often includes the air speed indicator, the altimeter, the vertical speed indicator, the artificial horizon indicator, and other appropriate displays. Additionally, the PFD may display navigational equipment displays such as a compass, a radar screen, a flight map, and a heading indicator.

Any or all of these displays may be accompanied by a multitude of selectable menu items, the menu items relating to aircraft settings. Many of these aircraft settings have selectable numerical values related therewith. Throughout a flight program, a pilot is presented with a multiplicity of menu items and must be able to conveniently and quickly select and modify any of the available aircraft settings.

Conventionally, menu items are selected by pressing one of a number of line select keys (LSKs). The LSKs are often located on the PFD, a menu item is chosen by pressing the LSK adjacent to the desired menu item. The display shows the menu item associated with the depressed LSK as a highlighted item. To modify the value of the menu item chosen, a pilot or user manipulates a separate knob to change a selected value.

The use of LSKs in combination with a separate control knob causes difficulties for a pilot. A pilot needs to keep at least one hand on the control column at all time. If, for example, the pilot needs to select a LSK located on the left side of the PFD (the PFD being located directly in front of the pilot), the pilot places his right hand on the control column and makes the LSK selection with his left hand. The pilot then affects the change to the selected value by turning a control knob located on a Display Control Panel (DCP), the DCP being located to the right of the PFD. Therefore, the pilot must place his left hand on the control panel and reach over with his right hand to make the necessary change to the selected menu item value. This process is non-ergonomic and requires excessive movement to make a change to the aircraft settings.

Accordingly, there is a need for an integrated device to make menu item selections and to subsequently make changes to the selected menu item values. There is also a need for an ergonomic selection device which minimizes movement inside the cockpit. Further still there is a need for a menu item selection and modification device, whereby the pilot's hand is not required to leave the device throughout the menu selection and value modification process. Further still there is a need for a remote menu operation device that does not require line select keys located adjacent the display device. Even further still, there is a need for a control knob on a display control panel (DCP) of an aircraft, and a method for using the control knob to select menu items on a Primary Flight Display (PFD) of the aircraft, and to modify the value of the selected menu item by use of a button on the control knob or other means integral to the knob (such as pushing or pulling the knob). As one knob will be used to select which items are active and to set values associated with some items, a means to differentiate the activity must exist.

SUMMARY OF THE INVENTION

The present invention relates to a menu item selection device. The menu item selection device includes a display device, a microprocessor, a control knob, and a switch, which must be an integral button or it may be a switch activated by the knob. The display device displays a menu of selectable items. The microprocessor is coupled to the display device and effects the output of the display. The control knob is coupled to the microprocessor and provides electrical input signals to the microprocessor, the signals being relevant to the state of the control knob. The state of the control knob causes a menu item to be highlighted The switch is configured to cause the highlighted menu item to be selected when the switch is depressed The control knob can be further used to change a value associated with a selected menu item by first pressing the switch, which causes the highlighted menu item to change appearance, turning the control knob so the value associated with the selected menu item may be chosen, and pushing the switch when the desired value is obtained so that the highlighted menu item returns to its normal (active) state.

The present invention further relates to an aircraft having a frame, a propulsion system, a lift generating system, and an operator cabin. The aircraft includes a display device, a microprocessor, a control knob, and a switch. The display device is located inside the operator cabin and displays a menu of selectable items. The microprocessor is coupled to the display device. The control knob is located inside the operator cabin, is coupled to the microprocessor, and provides an electrical input signal to the microprocessor relevant to the state of the control knob. The state of the control knob causes a menu item to be highlighted. The switch is configured to cause the highlighted menu item to be selected when the switch is depressed. The control knob may be further used to change a value associated with a selected menu item by first pressing the switch to change the appearance of the highlighted item, then turning the control knob so the value associated with the selected menu item may be chosen, then pushing the switch when the desired value is obtained and the item returns to its normal (active) appearance.

The present invention still further relates to a method for modifying the operating configuration of an aircraft. The method includes displaying a menu on a screen available to an operator, rotating a control knob to select a selected menu item from a set of menu items, depressing a control switch to activate a selected menu item, and rotating the control knob in one of the first direction and a isecond direction to adjust a value of the selected item. The menu includes a set of selectable menu items. The selected menu item is distinguished from all others on the screen as being selected. In a preferred embodiment the switch is a button, and the button is inset in the control knob, and the button is substantially coaxially aligned with the control knob. In an alternative embodiment the switch is integral to the knob shaft and is activated by pushing or pulling the switch. The value of the selected menu item is set by depressing the switch, when the desired value is reached by turning the knob.

According to one exemplary aspect of the present invention, the switch is integrated with the control knob. According to another exemplary aspect of the present invention, line select keys may be used as well as a control knob to select and modify menu items.

DETAILED DESCRIPTION OF THE PREFERRED EMBODIMENTS

Figure 1:
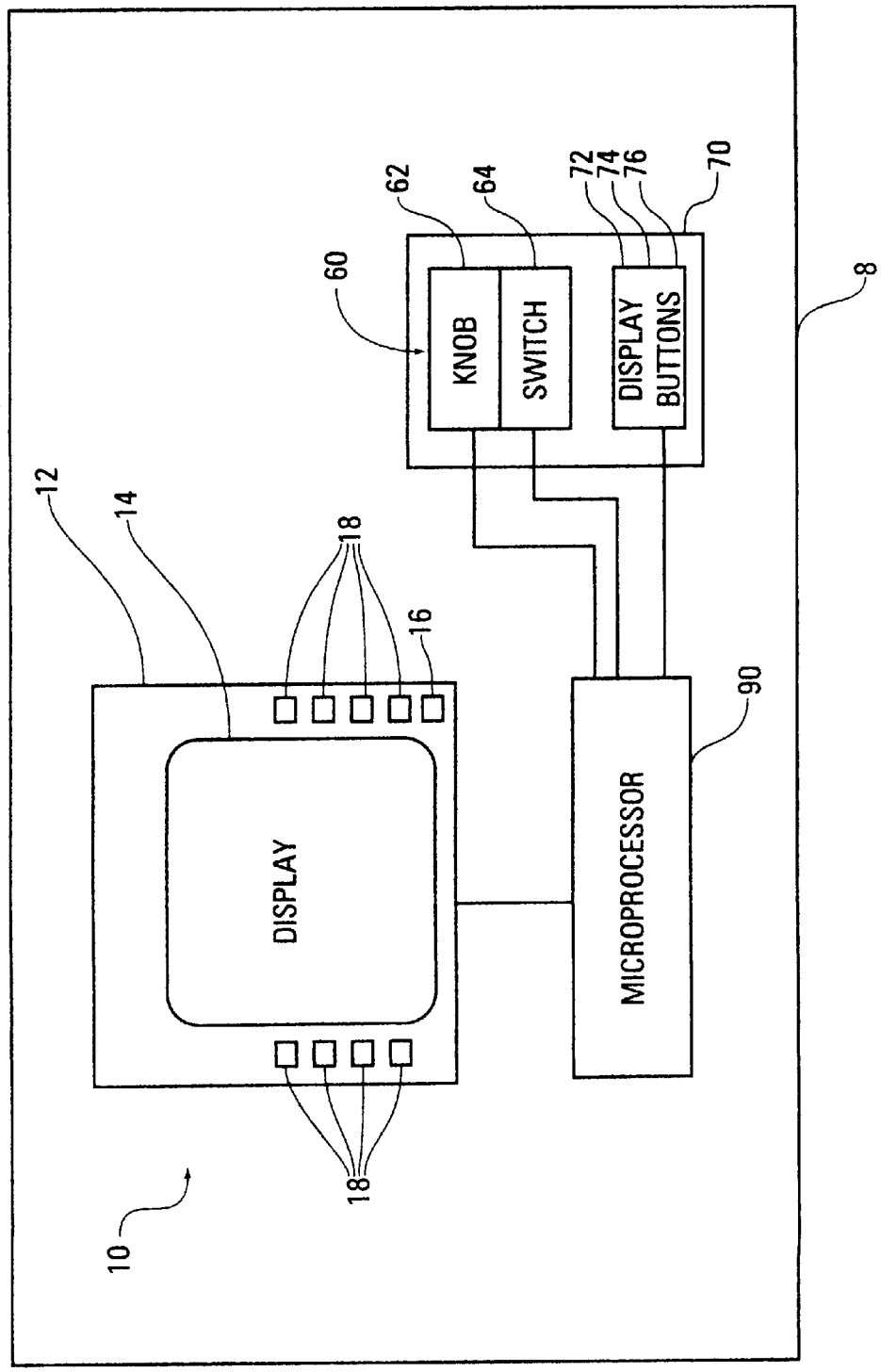
FIG. 1 is a general schematic block diagram of an aircraft having a display and menu system.

Turning now to FIG. 1, a block diagram of an aircraft 8 is depicted, having a Primary Flight Display (PFD) 10. PFD 10 is representative of flight displays in a variety of aircraft, including, but not limited to the Bell 609, and other passenger and military aircraft. PFD 10 includes a frame 12, a display screen 14, a brightness button 16, and a multiplicity of line select keys 18. PFD 10 is preferably mounted in the console directly in front of the pilot's seat, located in the cockpit cabin.

Figure 3:
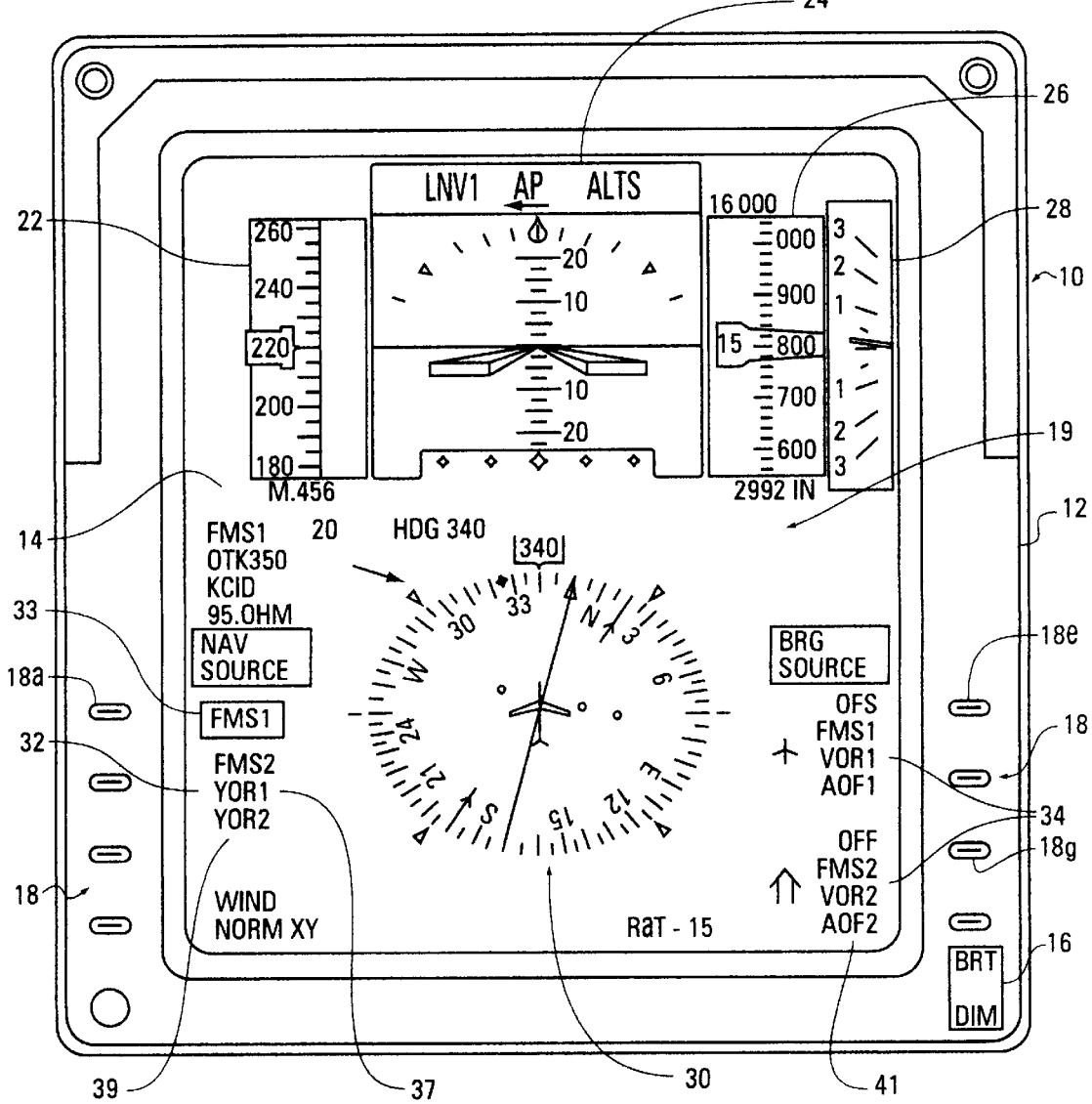
FIG. 3 is a front view schematic drawing of a primary flight display unit, displaying a navigation and bearing screen.
Figure 4:
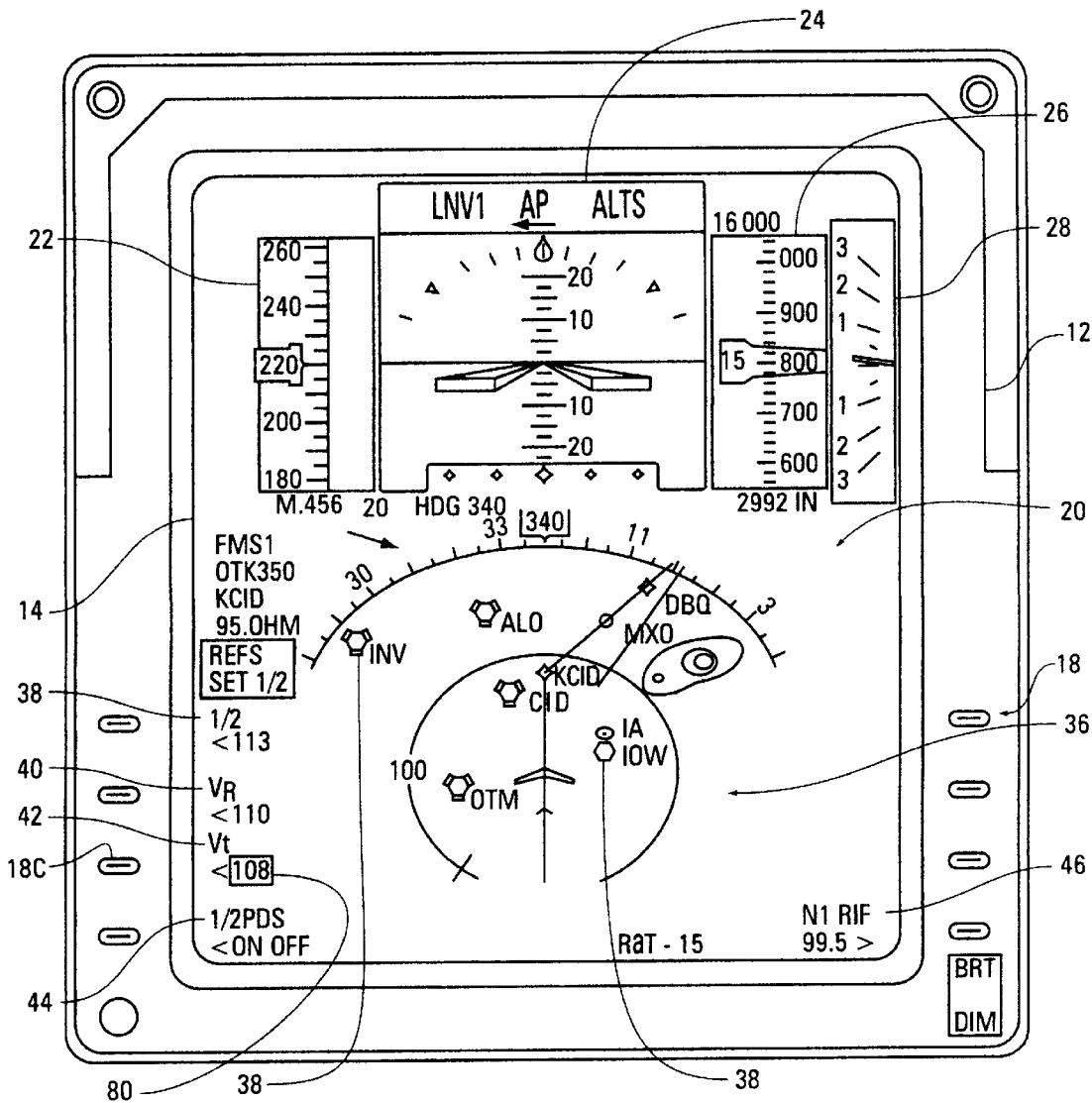
FIG. 4 is a front view schematic drawing of the primary flight display unit, displaying a references setting screen.

PFD 10 can display a variety of informational screens, including but not limited to a navigation and bearing (NAV/BRG) screen 19, depicted in FIG. 3, a references setting (REFS SET) screen 20, depicted in FIG. 4, a RADAR screen (not shown), and an engine status screen (not shown). On each of these display screens there are a number of selectable menu items. For example, in FIG. 3, a set of selectable navigation menu items 32 are shown and a set of selectable bearing menu items 34 are shown.

Figure 2:
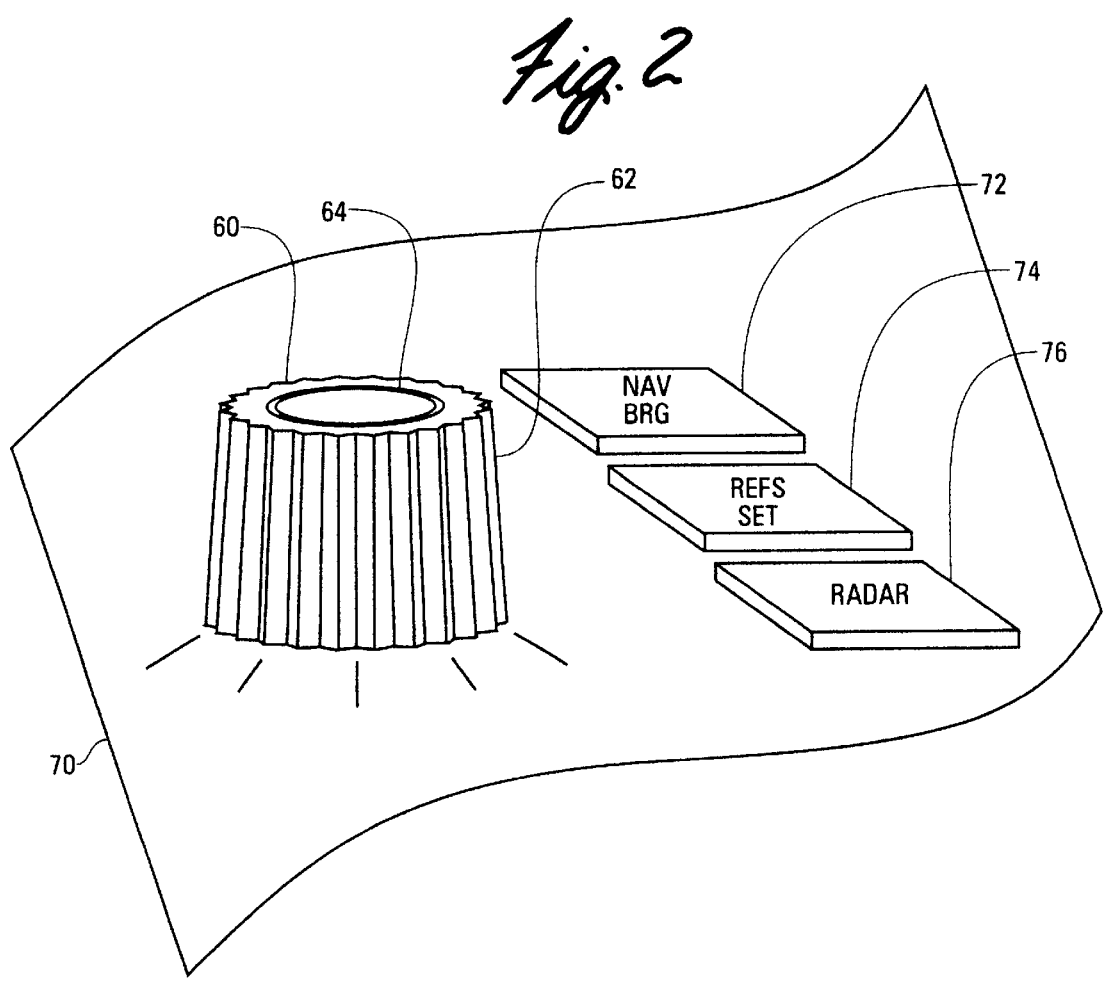
FIG. 2 is a partial perspective view schematic drawing of a display control panel showing a control knob with an inset button and showing three display screen keys.

In a preferred embodiment of the present invention, the menu items can be selected using a menu advance knob 60, depicted in the block diagram of FIG. 1 and depicted in FIG. 2. Menu advance knob 60 includes an outer rotatable knob 62 and an inset button 64. An alternative embodiment that uses an integral switch instead of a button, is not shown. The integrated knob and button combination 60 may be manufactured in a variety of configurations, not limited to the one depicted in FIG. 2, desirable configurations being ones in which the knob and button are operable using a single hand.

FIG. 2 depicts an exemplary embodiment of a display control panel (DCP) 70 (also shown in the block diagram of FIG. 1) having menu advance knob 60 and a series of display screen keys 72, 74, and 76. Depressing the NAV BRG display screen key 72 communicates an electrical signal to a microprocessor 90, depicted in the block diagram of FIG. 1. Microprocessor 90 communicates signals to display screen 14, such that display screen 14 shows navigation/bearing screen 19, as depicted in FIG. 3. Similarly, depressing REFS SET display screen key 74, has the effect of causing references setting screen 20 to be displayed on display screen 14, as depicted in FIG. 4. Finally, depressing RADAR display screen key 76 causes a RADAR display screen (not shown) to be shown on display screen 14. The RADAR display screen similarly has selectable menu items. Further, other display screen keys may be available on DCP 70 and may be used to activate a variety of other display screens while not departing from the spirit and scope of the present invention.

As depicted in FIG. 3, navigation/bearing screen 19 includes an air speed indicator 22, an artificial horizon 24, an altimeter 26, a vertical speed indicator 28, a compass 30, several navigation menu items (NAV SOURCE) 32, and several bearing menu items (BRG SOURCE) 34. Navigation menu items 32 can be selected by depressing line select key 18a. A selective change of navigation menu items 32 can be accomplished by again depressing LSK 18a. As depicted, navigation menu items FMS1 33 is selected (as shown by the box around the FMS1 text). Subsequent depressing of LSK 18a causes navigation menu items 32 to be selected in the vertical order shown (FMS1, FMS2, VOR1, VORS2, FMS1, etc.). Similarly, bearing menu items 34 may be selected by using LSKs 18e and 18g.

In a preferred embodiment of the present invention menu advance knob 60 may be used to select navigation menu items 32 and bearing menu items 34. Menu advance knob 60 may be used instead of LSKs 18, or in an alternative embodiment menu advance knob 60 may replace LSKs 18. A selective change of navigation menu items 32 and bearing menu items 34 may be made by rotating outer rotatable knob 62 of menu advance knob 60. If, for example FMS1 33 is the highlighted item, a counterclockwise rotation causes FMS2 35 to be highlighted, followed by VOR1 37 and VOR2 39. Continued counterclockwise rotation of outer knob 62 of menu advance knob 60 causes the highlighted item to be on the lower right hand side of display screen 14, highlighting ADF2 41. Continued counterclockwise rotation likewise continues sequential movement of the highlighting through the menu items in a roughly counterclockwise manner, relative to display screen 14. Similarly, a clockwise rotation of outer knob 62 of menu advance knob 60 causes the highlighting to advance in a roughly clockwise manner, relative to display screen 14. When a desired menu item is reached (highlighted), an operator selects that item by depressing inset button 64 of menu advance knob 60. Depressing inset button 60 causes a highlighted menu item to become active.

Referring now to FIG. 4, references setting screen 20 is depicted. References setting screen 20 is similar to navigation/bearing screen 20 depicted in FIG. 1 except that heading indicator 36 shows various airport locations 38 and references setting screen 20 shows a number of velocity settings. The velocity settings include, but are not limited to a take-off safety speed reference ($V_2$) 38, a rotation speed reference ($V_R$) 40, a target speed reference ($V_T$) 42, and a V speeds on/off ($V_{SPDS}$) 44, which turns on or off items 38, 40, and 42. The velocity settings shown in FIG. 4 have associated with them a numerical velocity value. The associated velocity values can be modified by an operator.

In a preferred embodiment of the present invention, the velocity settings, as depicted in FIG. 4, can be changed by one of two different methods, the choice of the two methods being left to the discretion of the pilot.

First, the velocity settings may be changed by using LSKs 18 in combination with outer rotatable knob 62. For example, to set target speed reference ($V_T$) 42, a pilot depresses LSK 18c. Depressing LSK 18c has the effect of highlighting the set target speed 80, as depicted in FIG. 4. Once the target speed has been highlighted, the target speed can be varied by rotating outer rotatable knob 62. Rotation of outer rotatable knob 62 causes $V_T$ 42 value to be incremented or decremented, depending on the direction of rotation of knob 42. Once a desired value is obtained and displayed, either of inset button 64 or LSK 18c can be depressed to set $V_T$ 42 to the displayed value.

The second selection method that may be used is by using only the integrated menu advance knob 60. For example, rotating outer rotatable knob 62 advances the menu selection from one item to the next. In a preferred embodiment, rotating outer rotatable knob 62 in a clockwise direction moves the highlighted area from $V_T$ 42, as depicted in FIG. 4, to $V_{SPDS}$ 44. Continued clockwise rotation moves the highlighted area to N1 REF 46, $V_2$ 38, $V_R$ 40 and back to $V_T$ 42. Counter clockwise rotation of outer rotatable knob 62 moves the highlighted area to the different menu items in the opposite order than stated above. When the desired menu item is highlighted by turning outer rotatable knob 62, inset button 64 is depressed, thereby changing the appearance of the highlighted menu item (e.g., the color changes; the item flashes; etc.). Once the highlighted menu item has changed appearance, the value of that item can be changed by rotating outer rotatable knob 62. In a preferred embodiment, outer rotatable knob 62 is configured to increment values when rotated clockwise and decrement values when rotated counterclockwise. When the desired value is achieved, pressing inset button 64 causes the value to become active and the highlighted value returns to its normal (active) appearance. However, any suitable directional convention may be used without departing from the spirit and scope of the present invention. Further, it is not necessary that the values be numerical values, rather the values may be sub menu items as opposed to numerical values.

By integrating outer rotatable knob 62 and inset button 64 into an integrated menu advance knob, the present invention solves the problems of the prior art by allowing menu item selection and selected item value modification remotely, away from the display screen, such as on DCP 70 (depicted in FIGS. 1 and 2). Additionally, any setting modification can be accomplished using a single hand, thereby allowing a pilot to keep a single hand on the control column at all times. The difference in appearance of the menu item allows the pilot to intuitively understand whether he is activating the item or changing its value.

Further, it should be noted that integrated menu advance knob 60 may be substituted by an integrated menu advance knob that does not have a button. An alternative integrated menu advance knob of this type has a rotatable knob on a shaft. The switch is integral to the knob via the shaft, whereby the switch is activated by pushing or pulling on the knob shaft via the knob itself.

Although only a few exemplary embodiments of this invention have been described above, those skilled in the art will readily appreciate that many modifications are possible in the exemplary embodiments without materially departing from the novel teachings and advantages of this invention. For example, the invention can be employed in a variety of environments that require menu items to be selected on a display screen. Further, the type of operator input device, i.e. the integrated control knob and inset button configuration, may vary insofar as it continues to accomplish remote menuing functions using a single hand.

Accordingly, all such modifications are intended to be included within the scope of the invention as defined in the following claims. Other substitutions, modifications, changes and omissions may be made in the design, operating conditions and arrangement of preferred and alternative embodiments without departing from the spirit of the invention as expressed in the appended claims.

What is claimed is:

1. A menu item selection device comprising:
   a display device displaying a menu of selectable items;
   a microprocessor coupled to the display device and affecting the output of the display;
   a control knob coupled to the microprocessor, and providing an electrical input signal to the microprocessor relevant to the state of the control knob, wherein the state of the control knob causes a selectable item of the selectable items to be highlighted on the display; and
   a switch configured to cause the highlighted menu item to be selected when the switch is depressed,
   wherein the control knob may be further used to change a value associated with a selected menu item by first pressing the switch, which causes the menu item to change appearance, then turning the control knob and wherein the value associated with the selected menu item can be chosen by pushing the switch when the desired value is obtained to make the item active, which causes it to appear in its normal state.

2. The menu item selection device of claim 1, wherein the switch is integrated with the control knob.

3. The menu item selection device of claim 2, wherein the knob has an outer surface that is substantially one of, a truncated conical shape, and a cylindrical shape, having a central longitudinal axis; and, wherein the switch is a button, the button being inset in the knob and extending substantially along the central longitudinal axis of the knob.

4. The menu item selection device of claim 2, wherein the switch is activated by one of pushing and pulling the knob.

5. The menu item selection device of claim 2, wherein the knob may be used to select items on a multiplicity of menus, the active menu being selected by the operator.

6. The menu item selection device of claim 2, further comprising:
   a multiplicity of line select keys,
   wherein the line select keys provide an alternative means to make a menu item selection.

7. The menu item selection device of claim 1, wherein the knob has a multiplicity of detents, the detents providing a positive positional feel to an operator turning the knob.

8. The menu item selection device of claim 1, wherein the value associated with a selected menu item is incremented by turning the knob in a first direction and decremented by turning the knob in a second direction.

9. An aircraft having a frame, a propulsion system, a lift generating system, and an operator cabin, the aircraft comprising:
   a display device located inside the operator cabin, displaying a menu of selectable items;
   a microprocessor coupled to the display device;
   a control knob, located inside the operator cabin, coupled to the microprocessor, and providing an electrical input signal to the microprocessor relevant to the state of the control knob, wherein the state of the control knob causes a menu item to be highlighted; and
   a switch configured to cause the highlighted menu item to be selected when the switch is depressed,
   wherein the control knob may be further used to change a value associated with a selected menu item by first pressing the switch, which causes the menu item to change appearance, then turning the control knob and wherein the value associated with the selected menu item may be chosen, then by pushing the switch when the desired value is obtained to make the item active, which causes it to appear in its normal state.

10. The aircraft of claim 9, wherein the switch is integrated with the control knob.

11. The aircraft of claim 10, wherein the knob has an outer surface that is substantially one of, a truncated conical shape, and a cylindrical shape, having a central longitudinal axis; and, wherein the button is inset in the knob and extends substantially along the central longitudinal axis of the knob.

12. The aircraft of claim 10, wherein the switch is activated by one of pushing and pulling the knob.

13. The aircraft of claim 11, wherein the knob may be used to select items on a multiplicity of menus, the active menu being selected by the operator.

14. The aircraft of claim 9, wherein the knob has a multiplicity of detents, the detents providing a positive positional feel to an operator turning the knob.

15. The aircraft of claim 14, wherein the knob communicates a digital signal to the microprocessor.

16. The aircraft of claim 9, further comprising:
    a multiplicity of line select keys,
    wherein the line select keys provide an alternative means to make a menu item selection.

17. The aircraft of claim 9, wherein the value associated with a selected menu item is incremented by turning the knob in a first direction and decremented by turning the knob in a second direction.

18. The aircraft of claim 9, wherein the knob is located on a Display Control Panel (DCP).

19. The aircraft of claim 18, wherein the displayed menus are displayed on a Primary Flight Display (PFD).

20. A method for modifying the operating configuration of an aircraft, the method comprising:

displaying a menu on a screen available to an operator, the menu comprising a set of selectable menu items;

rotating a control knob in a first direction to select a selected menu item from the set of menu items, the selected menu item being distinguished from all others on the screen as being selected;

depressing a switch to activate the selected menu item, the switch being integral in the control knob;

rotating the control knob in one of the first direction and a second direction to adjust a value of the selected item; and depressing the switch when a desired value is eached, thereby making that value active.

21. The method of claim 20, wherein the values of the selected items displayed are incremented, by an appropriate preset increment, when the knob is rotated in a first direction and wherein the values of the selected items displayed are decremented, by an appropriate preset decrement when the knob is rotated in a second direction.

22. The method of claim 21, wherein the control knob is located on a Display Control Panel (DCP) and the displayed menus are displayed on a Primary Flight Display (PFD).

* * * * *